United States Patent [19]
Ichino

[11] Patent Number: 5,943,522
[45] Date of Patent: *Aug. 24, 1999

[54] CAMERA AND CARTRIDGE MOVING APPARATUS

[75] Inventor: Kazushige Ichino, Tokyo, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/661,226

[22] Filed: Jun. 10, 1996

[30] Foreign Application Priority Data

Jun. 19, 1995 [JP] Japan .................................... 7-173920
Feb. 20, 1996 [JP] Japan .................................... 8-031909

[51] Int. Cl.[6] ........................... G03B 17/26; G03B 17/02
[52] U.S. Cl. ....................... 396/511; 396/516; 396/536; 396/538
[58] Field of Search .................................... 396/511, 512, 396/513, 514, 515, 516, 518, 522, 535, 536, 538

[56] References Cited

U.S. PATENT DOCUMENTS

| 5,159,365 | 10/1992 | Takahashi et al. | 396/512 |
| 5,323,201 | 6/1994 | Richiuso et al. | 396/536 |
| 5,477,295 | 12/1995 | Lawther et al. | 396/538 |
| 5,483,314 | 1/1996 | Lawther et al. | 396/511 |

FOREIGN PATENT DOCUMENTS

0628850 12/1994 European Pat. Off. .
0681203 11/1995 European Pat. Off. .

OTHER PUBLICATIONS

Patent Abstracts of Japan No. JP–A–07 056219, published Mar. 3, 1995.

*Primary Examiner*—Eddie C. Lee
*Attorney, Agent, or Firm*—Robin, Blecker & Daley

[57] ABSTRACT

A camera or a cartridge moving apparatus comprises an engagement portion which engages a cartridge and moves the cartridge relative to a cartridge loading chamber, and a holding device which holds the engagement portion so as to be movable in at least two directions which are approximately perpendicular to a direction in which the cartridge is moved by the engagement portion.

52 Claims, 12 Drawing Sheets

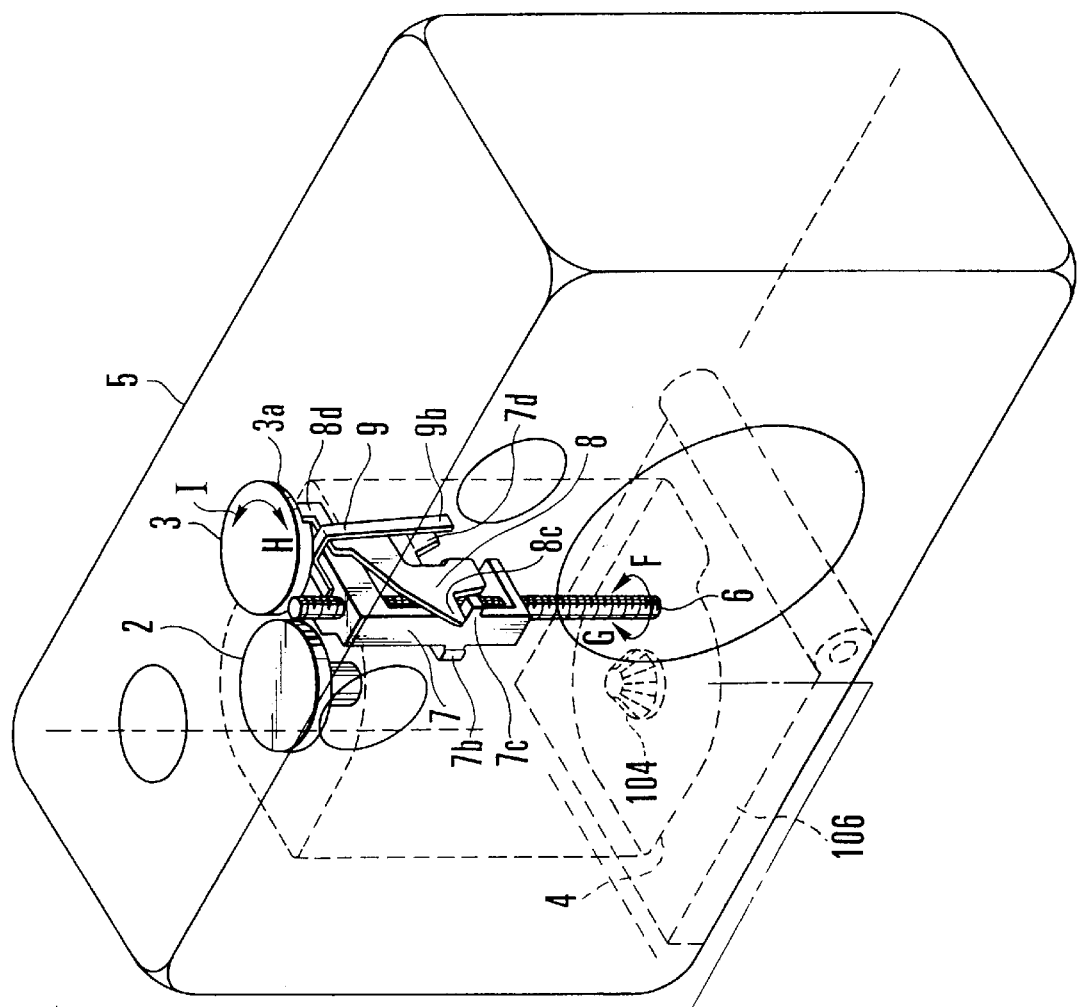
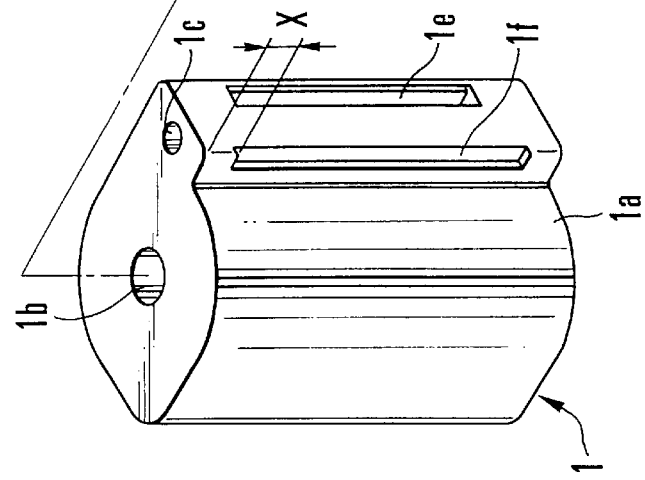
FIG. 1

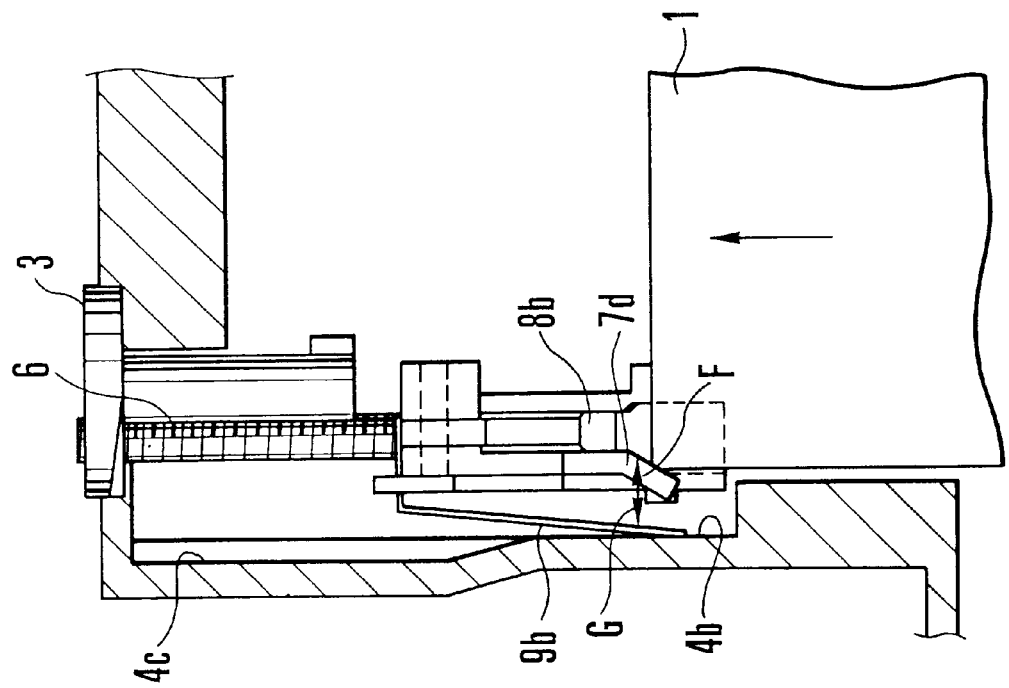
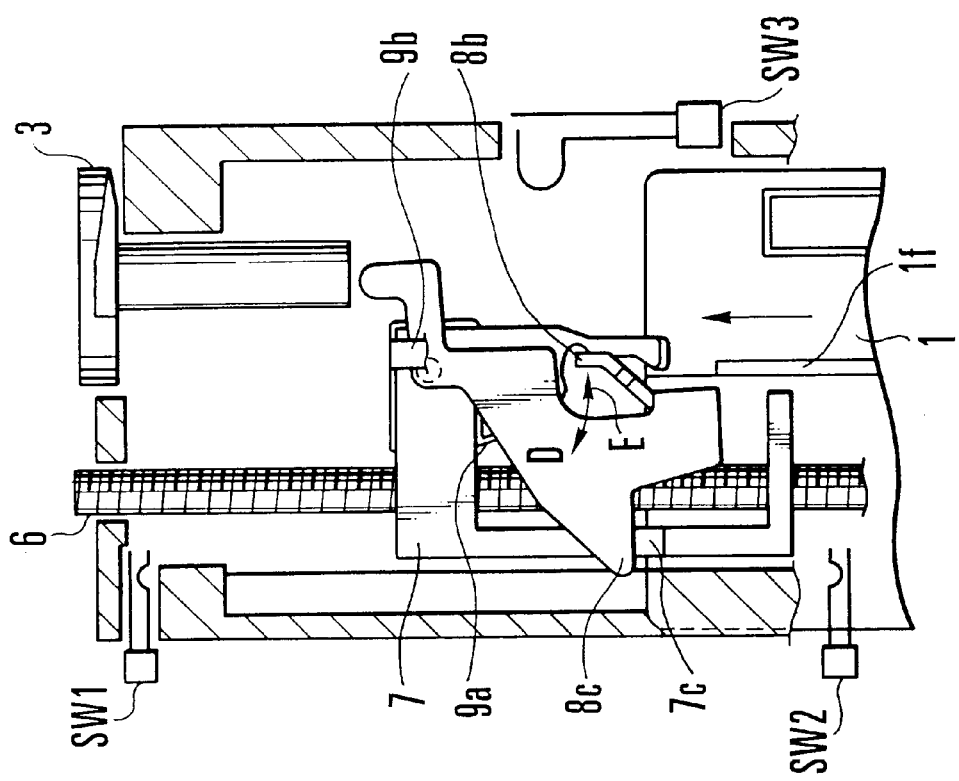

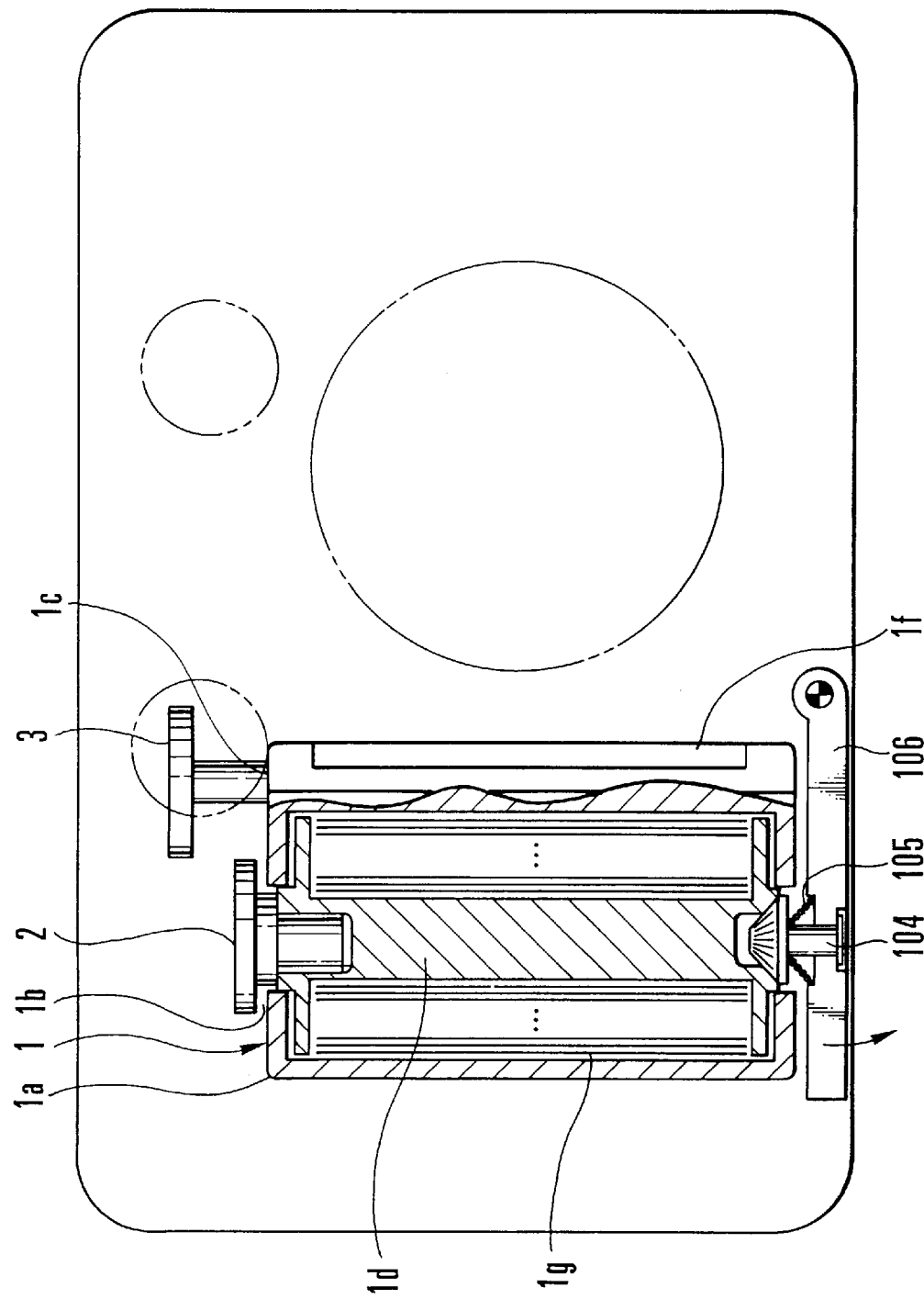

CAMERA AND CARTRIDGE MOVING APPARATUS

BACKGROUND OF THE INVENTION

1. Field of the Invention

This invention relates to an improvement on a camera or a cartridge moving apparatus arranged to load and eject a film cartridge by moving the film cartridge relative to a cartridge chamber.

2. Description of the Related Art

Heretofore, a film cartridge (hereinafter simply referred to as cartridge) of the kind containing a whole roll of film therein and having a light-shielding opening/closing door and a cartridge of the kind containing a film which is provided with a magnetic recording part have been proposed. Meanwhile, there have been proposed cameras of varied kinds arranged to record photographing information in the magnetic recording part of the film or to reproduce from the magnetic recording part some information such as a specified number of photographing frames, etc.

FIG. 11 shows the appearance of a cartridge of the kind containing a whole roll of photographic film and having a light-shielding opening/closing door. FIG. 12 is a sectional view of a camera taken across the center of the cartridge of FIG. 11 and showing the camera as in a state of being loaded with the cartridge.

Referring to FIGS. 11 and 12, the cartridge 1 has an external wall 1a. A cartridge shaft 1d is arranged to take up and wind a film 1g thereon inside the cartridge 1. A hole 1b is formed in the upper side of the external wall 1a and is arranged to allow a fork 2 of the camera to fit into the cartridge shaft 1d. Another hole 1c is formed also in the upper side of the external wall 1a and is arranged to allow an opening/closing driver 3 of the camera to be inserted therein to open or close the light-shielding opening/closing door 1e.

With the cartridge 1 configured in the above-described manner, there have been proposed cameras of varied kinds arranged to load and eject the cartridge 1 in the axial direction thereof. Some of the cameras of those kinds are arranged to electrically load and eject the cartridge 1 by means of a motor or the like, as will be described below.

First Example of Prior Art

In a camera disclosed in Japanese Laid-Open Patent Application No. HEI 5-210163, the cartridge 1 is loaded and ejected by moving upward and downward a cartridge holding member arranged to hold the end face and external wall of the cartridge 1, by means of a feed screw, in association with opening and closing of a cartridge chamber lid of the camera.

Second Example of Prior Art

For a camera arranged to magnetically record or reproduce information into or from a magnetic recording part provided on the surface of a film contained in the cartridge 1 as shown in FIG. 11, a structural arrangement for accurate magnetic recording and reproduction has been proposed as follows, as disclosed in Japanese Laid-Open Patent Application No. HEI 4-234744. According to that arrangement, only a cartridge shaft winding the film thereon is supported at both ends thereof with the external wall, etc., of the cartridge 1 not being touched, so that, by rotating the cartridge shaft, a transporting speed of the film is stabilized for accurate magnetic recording and reproduction.

The details of the second example of prior art are described with reference to FIG. 13, as follows. The camera is arranged not to support and touch the external wall 1a, etc., of the cartridge 1 but to support the cartridge shaft 1d at both ends thereof with a film transport fork 2 and a support member 104 which is disposed in a position opposed to the film transport fork 2. The support member 104 is rotatably supported by a cartridge chamber lid 106 and is axially urged by a spring 105, so that the cartridge shaft 1d is thus arranged to be stably pushed by the support member 104 against the film transport fork 2 and to be rotatable.

The cartridge 1 is thus held by supporting only the cartridge shaft 1d without supporting the external wall 1a, etc., of the cartridge 1. Hereinafter, the state of support obtained by this structural arrangement will be called "floating" state, since the cartridge 1 appears to be floating inside the cartridge chamber when only the external wall 1a is taken into consideration.

Since the first example of prior art is arranged to load and eject the cartridge 1 while holding the external wall 1a, etc., of the cartridge 1 in whole, the structural arrangement of the first example of prior art tends to become large and complex and, unlike in the case of the second example of prior art, is incapable of supporting the loaded cartridge 1 in the floating state mentioned above.

SUMMARY OF THE INVENTION

In accordance with one aspect of this invention, there is provided a camera or a cartridge moving apparatus comprising an engagement portion which engages a cartridge and moves the cartridge relative to a cartridge loading chamber, and a holding device which holds the engagement portion so as to be movable in at least two directions which are approximately perpendicular to a direction in which the cartridge is moved by the engagement portion, so that the cartridge can securely be moved relative to the cartridge loading chamber, irrespective of inconstancy in size or irregular movement of the cartridge, with a simple and compact structure.

The above and other aspects and features of this invention will become apparent from the following detailed description of an embodiment thereof taken in connection with the accompanying drawings.

BRIEF DESCRIPTION OF THE DRAWINGS

FIG. 1 is an oblique view showing the arrangement of essential parts of a camera arranged according to this invention as a first embodiment thereof.

FIGS. 7(a) and 7(b) are sectional views showing the camera of FIG. 1 in a state obtained immediately after the cartridge is inserted.

FIG. 13 is a sectional view showing the arrangement of holding the cartridge in loading the cartridge into the conventional camera.

DETAILED DESCRIPTION OF THE PREFERRED EMBODIMENT

The following describes in detail a preferred embodiment of this invention with reference to the drawings.

Figure 2:
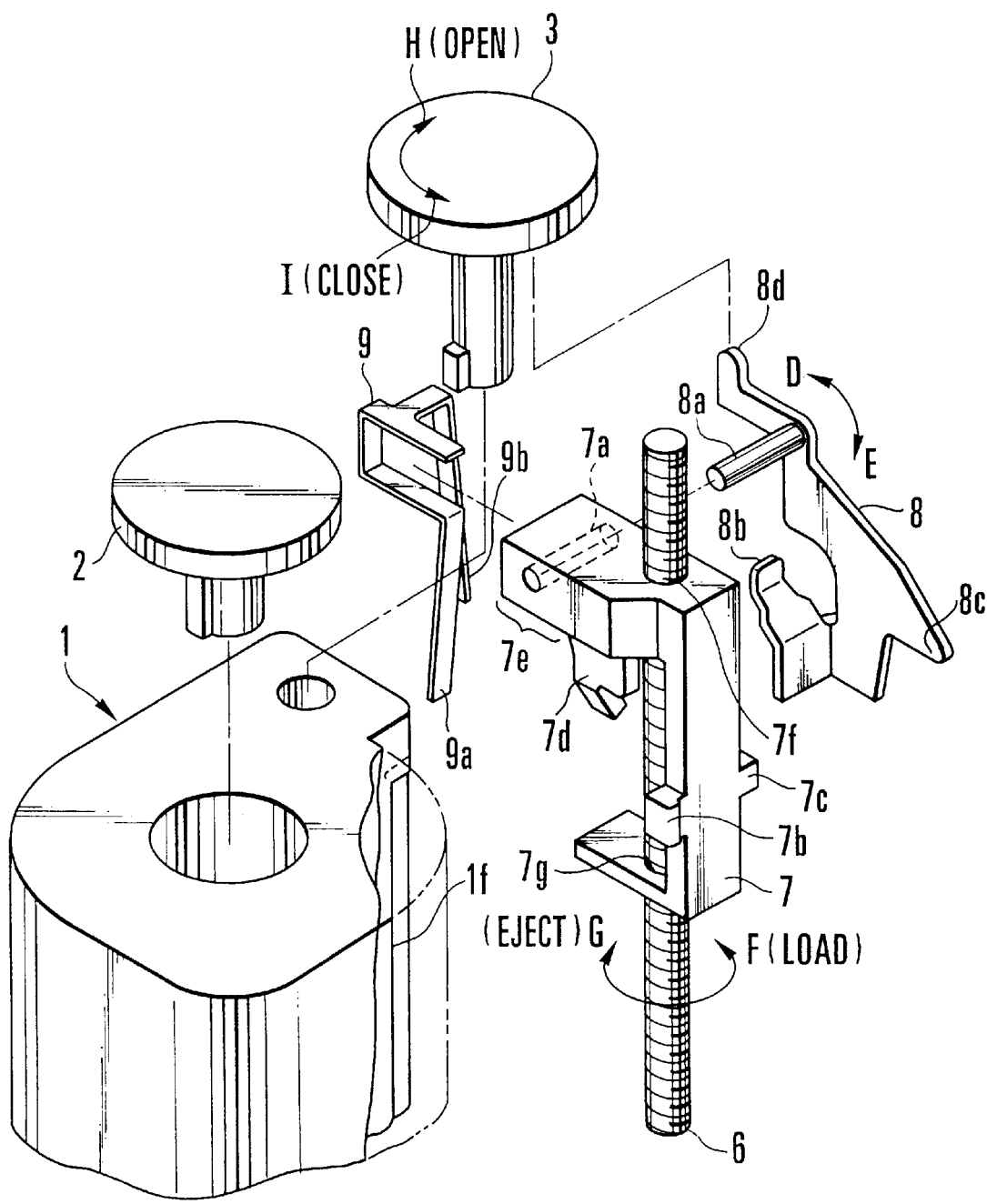
FIG. 2. is an exploded oblique view showing the component parts of the camera of FIG. 1.
Figure 3:
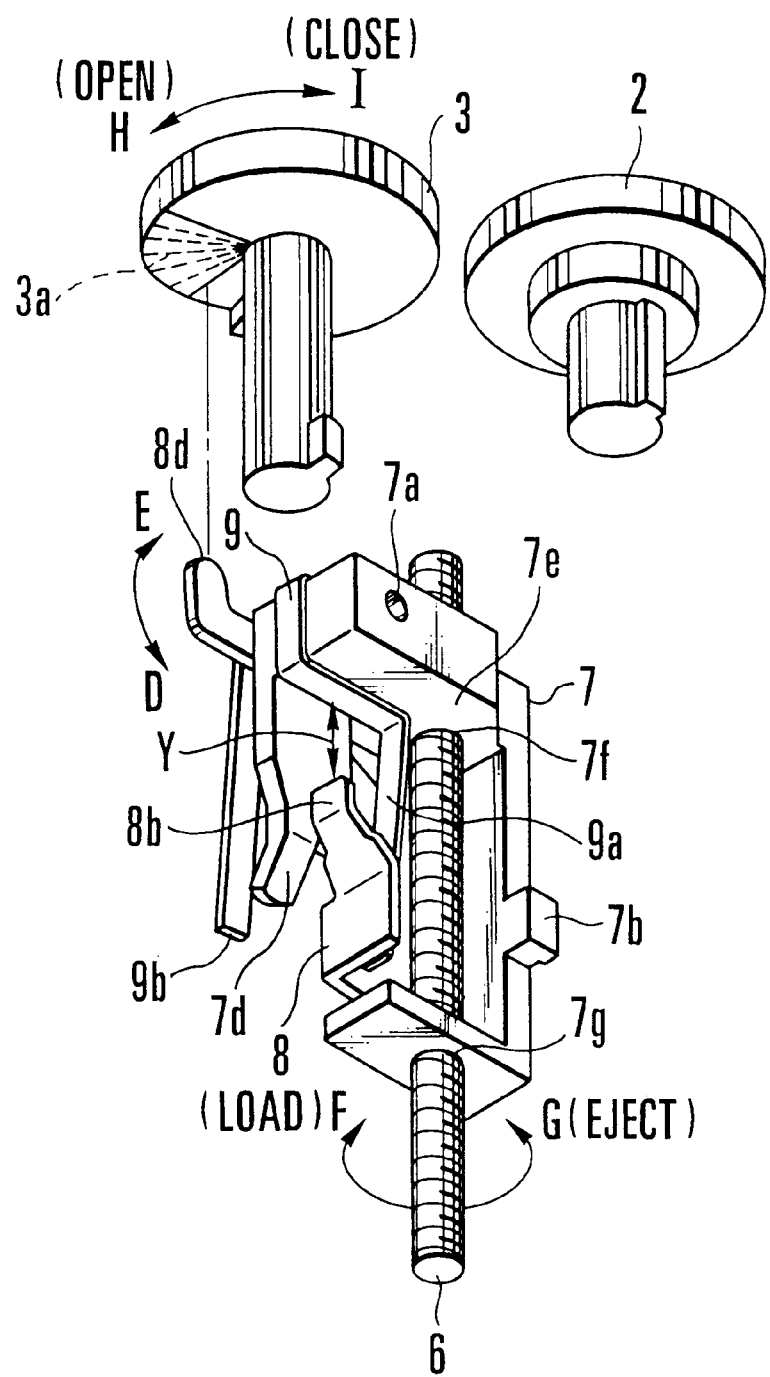
FIG. 3 is an exploded oblique view showing the same component parts of FIG. 1 as viewed from a different angle.

FIG. 1 shows in an oblique view the arrangement of essential parts of a camera arranged as an embodiment of this invention. FIG. 2 shows the essential parts in an exploded oblique view. FIG. 3 shows the essential parts as viewed from a different angle.

Figure 4A:
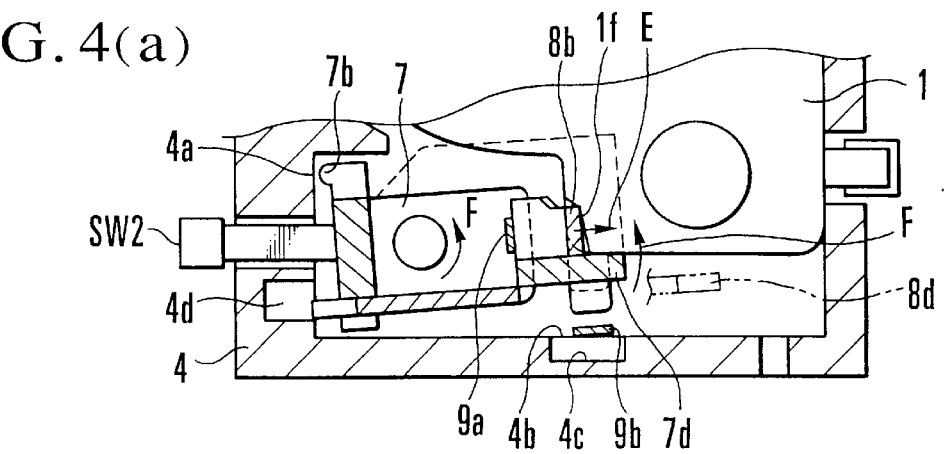
FIGS. 4(a) and 4(b) are sectional views showing the camera of FIG. 1 in a state obtained when loading of a cartridge has been completed.
Figure 4B:
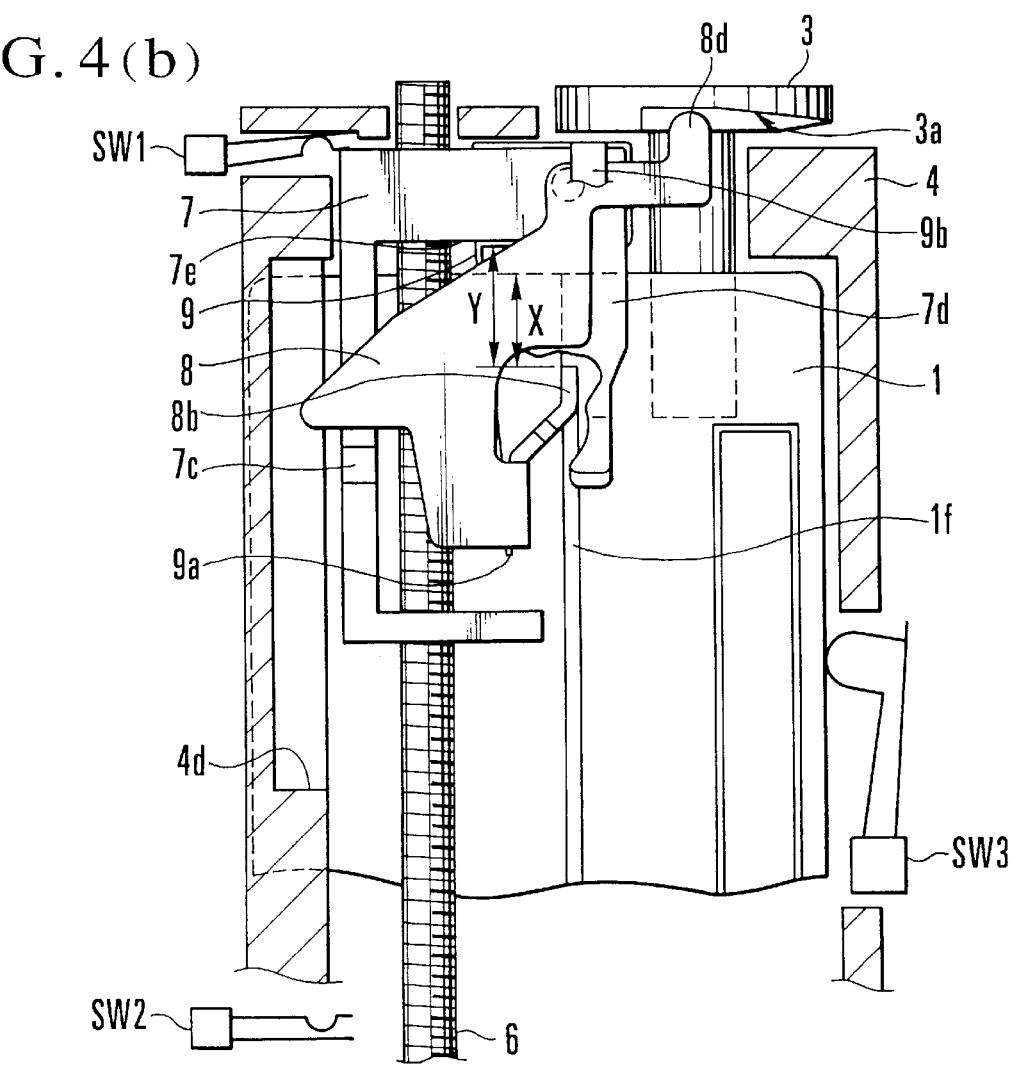
Figure 11:
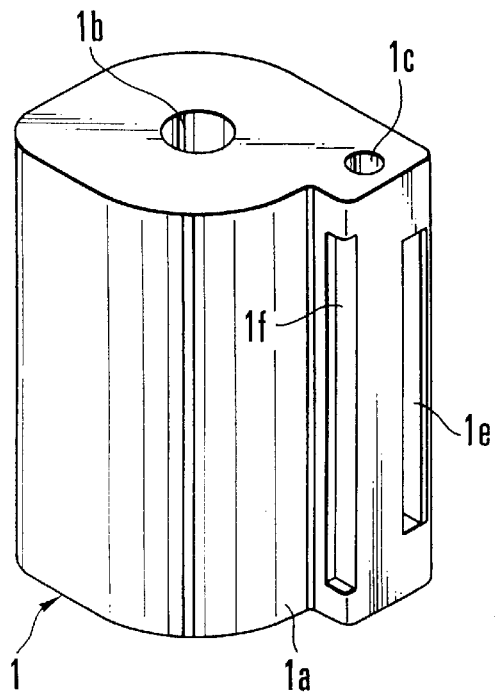
FIG. 11 shows the appearance of a cartridge of the kind containing a whole roll of film therein and having an light-shielding opening/closing door.
Figure 12:
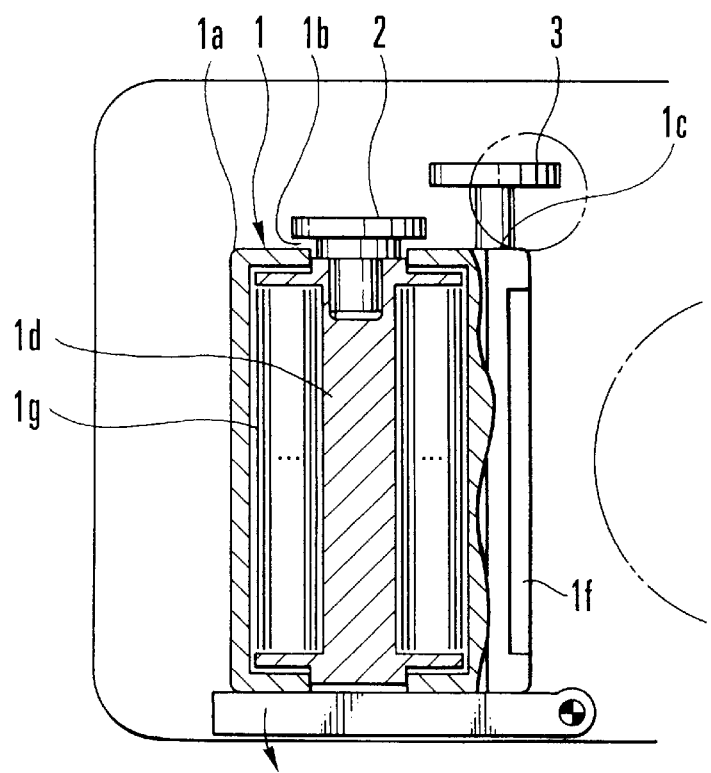
FIG. 12 is a sectional view showing a camera in a state of being loaded with the cartridge of FIG. 11 and taken across a center part of the cartridge.

FIGS. 4(a) and 4(b) to FIGS. 7(a) and 7(b) are sectional views showing the functions of parts to be performed in loading (drawing-in) and ejecting (delivering) the cartridge. Of these drawings, FIGS. 4(a), 5(a) and 6(a) are cross sectional views of the camera in the respective different states, and FIGS. 4(b), 5(b) and 6(b) are longitudinal sectional views of the camera in the states of FIGS. 4(a), 5(a) and 6(a), respectively. FIG. 7(a) is a longitudinal sectional view showing the camera in a state obtained immediately after the cartridge is inserted. FIG. 7(b) is a longitudinal sectional view showing the camera as in the same state but as viewed from behind the camera. In these drawings, all the component parts that are arranged in the same manner as those shown in FIGS. 11, 12 and 13 are indicated by the same reference numerals.

Referring to these drawings, a camera body 5 is provided with a cartridge chamber 4 having an opening in the bottom of the camera body 5 (see FIG. 1), and the cartridge 1 can be inserted upward into the cartridge chamber 4 through the opening. Above the cartridge chamber 4, there are disposed a film transport fork 2 and an opening/closing driver 3 in the same manner as the prior art described in the foregoing. The film transport fork 2 and the opening/closing driver 3 are rotatably supported by a means (not shown).

The opening/closing driver 3 is arranged to be driven by an opening/closing motor as will be described later and to open the light-shielding opening/closing door 1e by rotating in the direction of arrow H and to close the light-shielding opening/closing door 1e by rotating in the direction of arrow I.

A feed screw 6 is placed inside the cartridge chamber 4 and is arranged to be rotated by a power transmitted from a transporting (loading and ejecting) motor which will be described later (see FIGS. 1, 2 and 3). The cartridge 1 can be loaded or ejected as the feed screw 6 is rotated.

As shown in FIGS. 1, 2 and 3, a delivery base 7 is screwed on the feed screw 6 in such a way as to move up and down in association with the rotation of the feed screw 6. In the case of this embodiment, the feed screw 6 has a left lead, instead of a normal right lead. Therefore, the delivery base 7 moves in the direction of ejecting, i.e., downward as viewed on FIG. 1, when the feed screw 6 rotates in the direction of arrow G, and moves in the direction of loading, i.e., drawing-in, when the feed screw 6 rotates in the direction of arrow F.

The delivery base 7 is provided with a hole 7a, into which a support shaft 8a (see FIG. 2) of a drawing-in hook 8 is fitted. The drawing-in hook 8 is thus arranged to be rotatable either in the direction of arrow D or in the direction of arrow E. As shown in FIGS. 1, 2 and 3, the delivery base 7 has a first abutting part 7b, a second abutting part 7c, a guide part 7d, a delivery arm part 7e, a female screw part 7f and a guide hole 7g. The guide hole 7g is not in mesh with the feed screw 6 but is fitted only on the outer diametral part of the feed screw 6 and is arranged to prevent the delivery base 7 from slanting in moving in the direction of loading or ejecting.

A leaf spring 9 is fixed, as shown in FIGS. 1, 2 and 3, to the delivery base 7 and has a first spring part 9a and a second spring part 9b. The first spring part 9a is arranged to urge the drawing-in hook 8 to swing in the direction of arrow E. The second spring part 9b is arranged to have its fore end abutting on a second wall part 4b of the cartridge chamber 4 and to urge the delivery base 7, etc., including the drawing-in hook 8, to rotate relative to the feed screw 6 in the direction of arrow F (in the direction of loading), as shown also in FIG. 4(a).

While the delivery base 7, etc., are urged to rotate in the direction of arrow F by the second spring part 9b of the leaf spring 9 as mentioned above, this rotation is restricted by the first abutting part 7b of the delivery base 7 [see FIG. 4(a)]. The first abutting part 7b imposes such a restriction by abutting on a first wall part 4a of the cartridge chamber 4. However, FIG. 4(a) does not show an actual rotation restricting state because, in this instance, as shown in FIG. 4(b), the camera is loaded with the cartridge 1, which determines the rotating position of the delivery base 7.

The second abutting part 7c of the delivery base 7 is arranged to restrict the urged swing of the drawing-in hook 8 in the direction of arrow E by abutting on a stopper 8c of the drawing-in hook 8 as shown in FIG. 1. Further, the guide part 7d of the delivery base 7 is provided with a slanting face for guiding the cartridge 1 when the cartridge 1 is inserted, as will be described later herein. The delivery arm part 7e of the delivery base 7 is arranged to push the upper surface of the cartridge 1 in ejecting the cartridge 1.

As shown in FIG. 2, etc., the drawing-in hook 8 is provided with a hook claw 8b, the stopper 8c and a driving arm 8d in addition to the support shaft 8a. The hook claw 8b is arranged to engage a recessed part 1f of the cartridge 1 and acts to draw in the cartridge 1. The stopper 8c is arranged to abut on the second abutting part 7c of the delivery base 7 and thus to restrict the swing of the drawing-in hook 8, as mentioned above (see FIG. 1). The driving arm 8d is located in a position to be capable of abutting on a cam face 3a of the opening/closing driver 3. Therefore, when the opening/closing driver 3 rotates in the direction of opening (in the direction of arrow H), the drawing-in hook 8 swings in the direction of arrow D, as shown in FIGS. 4(b) to 5(b).

In loading (drawing in) the cartridge 1, the hook claw 8b engages the recessed part 1f of the cartridge 1 as mentioned above. For the engagement between the hook claw 8b and the recessed part 1f, a distance Y between the hook claw 8b and the delivery arm part 7e of the delivery base 7 (including the thickness of the leaf spring 9, to be exact) and a distance X between the recessed part 1f and the upper surface of the cartridge 1 must be in a relation expressed as

X≦Y

[see FIG. 4(b)]. In the embodiment of this invention, a relation of "X<Y" is set forth, so that, even when the cartridge 1 is engaging the hook claw 8b, the cartridge 1 has a certain amount of play in the direction of loading.

Figure 6A:
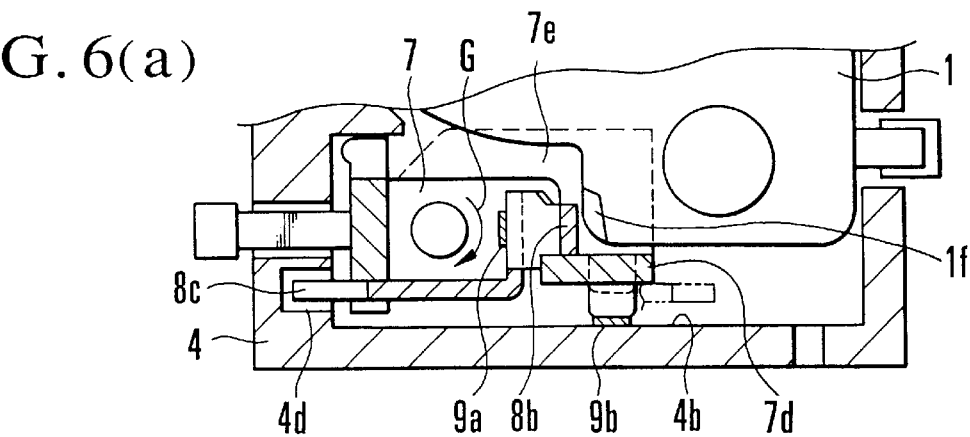
FIGS. 6(a) and 6(b) are sectional views showing the camera of FIG. 1 in a state obtained when ejection of the cartridge has been completed.
Figure 6B:
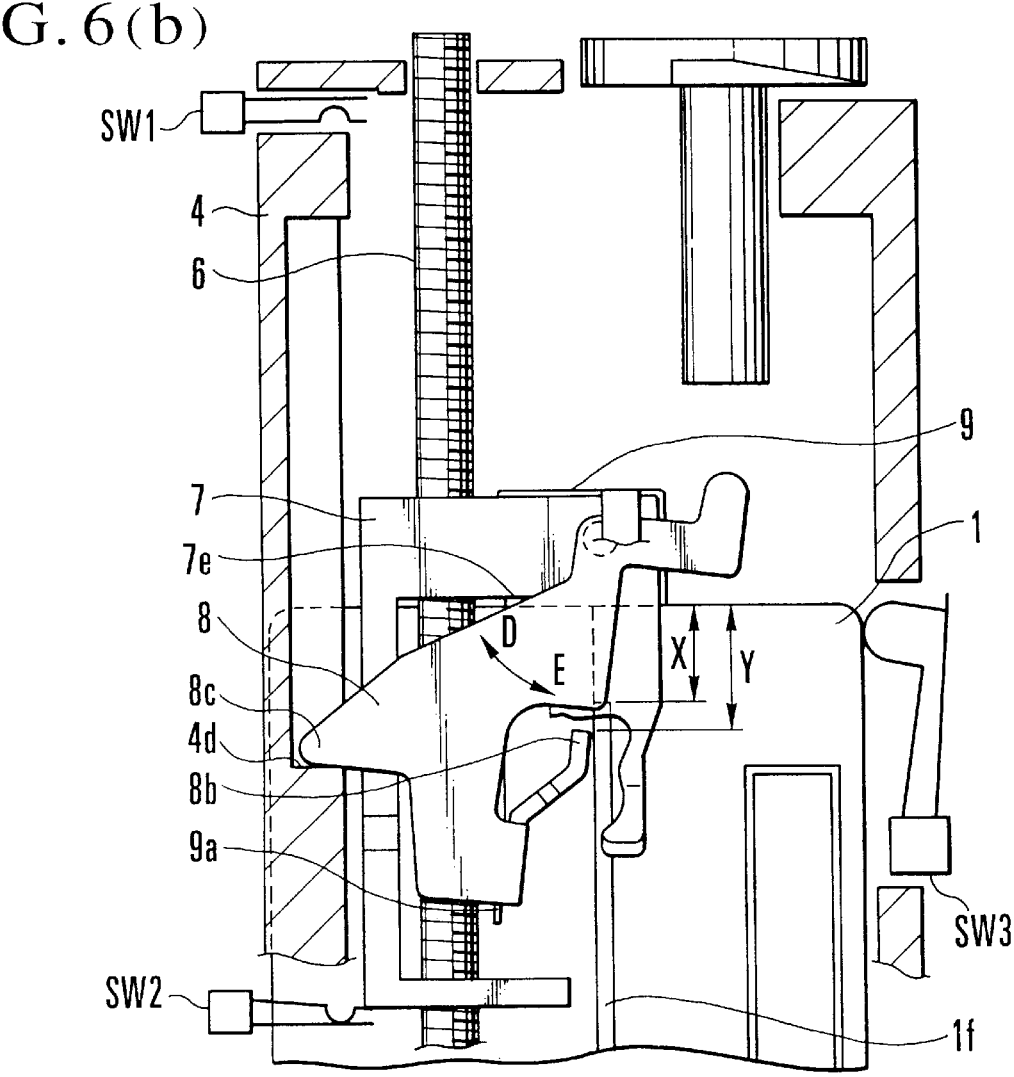

In other words, the cartridge 1 has a clearance relative to the delivery base 7 while the cartridge 1 is in process of being loaded (drawn in) as shown in FIG. 4(b) and also has a clearance relative to the hook claw 8b while the cartridge 1 is in process of being ejected as shown in FIG. 6(b). Further, the cartridge 1 has a clearance relative to each of the delivery base 7 and the hook claw 8b when loading of the cartridge 1 has been completed. This arrangement enables the embodiment to have the cartridge 1 in the floating state in the loading direction after completion of loading.

The cartridge chamber 4 is provided with a third wall part 4c and a hook abutting part 4d in addition to the first and second wall parts 4a and 4b, as shown in FIGS. 4(a) and 4(b). The third wall part 4c is set back and recessed from the second wall part 4b. The wall parts 4b and 4c are arranged to be smoothly continuing to each other through a slanting surface as shown in FIG. 7(b).

While the above-stated first wall part 4a is arranged to restrict the rotation of the delivery base 7 in the direction of arrow F (the loading direction), the second wall part 4b has the second spring part 9b of the leaf spring 9 abutting thereon so as to generate a turning force in the direction of arrow F, as shown in FIGS. 4(a) and 7(b). The second spring part 9b generates the turning force in the direction of arrow F when the delivery base 7 is in a lower position with respect to the cartridge chamber 4, either after ejecting the cartridge 1 or in a stand-by state before loading the cartridge 1. When the delivery base 7 is in a higher position after completion of loading, since the third wall part 4c is away from the second spring part 9b of the leaf spring 9 [see FIG. 7(b)], no turning force is generated at the delivery base 7, thereby leaving the delivery base 7 freely rotatable relative to the feed screw 6 [see FIG. 5(a)].

The hook abutting part 4d is arranged to have the stopper 8c of the drawing-in hook 8 abutting thereon when the delivery base 7 has moved down and then to cause the drawing-in hook 8 to swing in the direction of arrow D, as shown in FIGS. 6(a) and 6(b).

Figure 8:
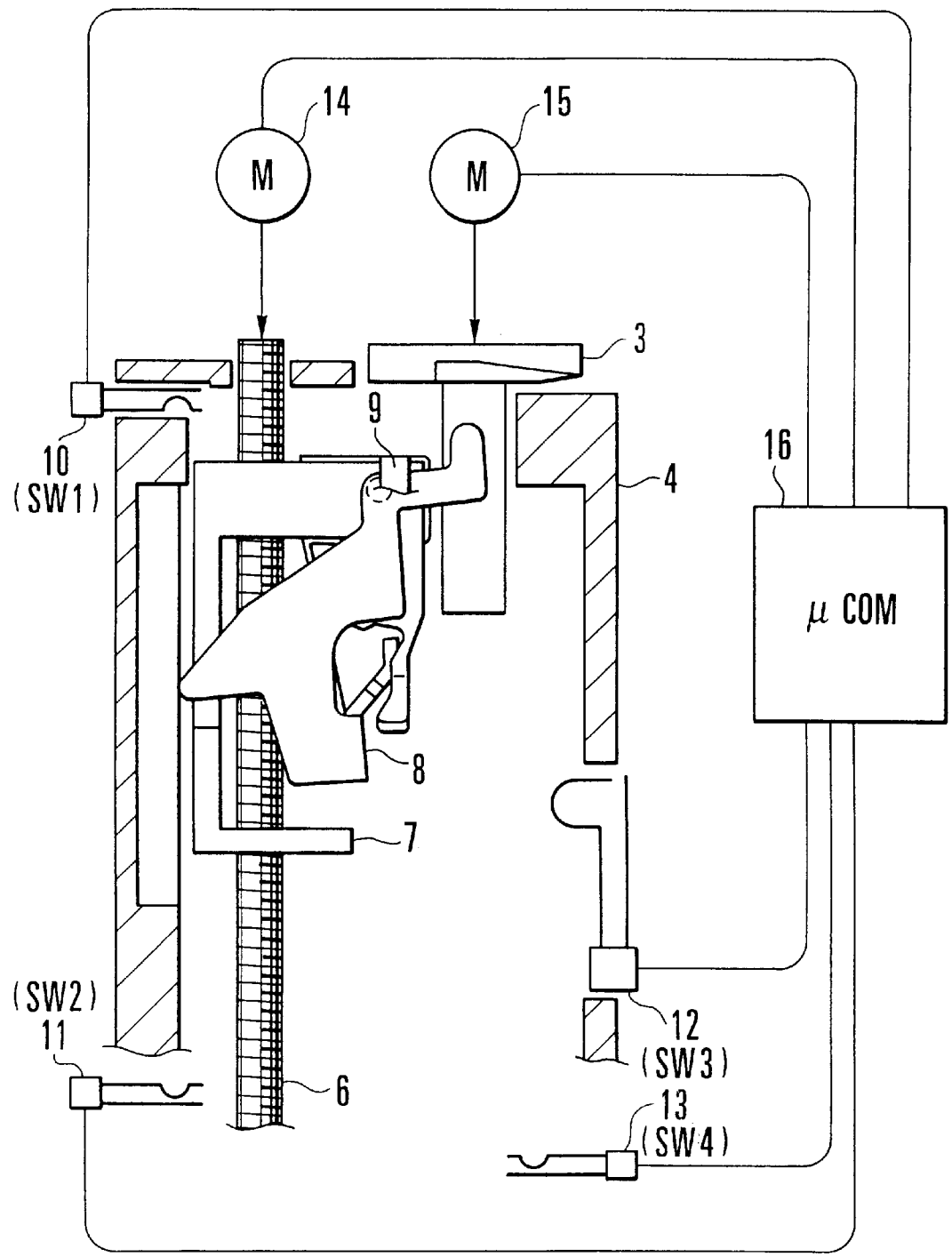
FIG. 8 shows an arrangement for driving and controlling the components parts of the camera of FIG. 1.

FIG. 8 shows in outline an arrangement for driving and controlling the component parts described above. Referring to FIG. 8, there are provided switches SW1 (10) and SW2 (11) at upper and lower parts on one side of the cartridge chamber 4 for detecting the position of the delivery base 7. The switch SW1 (10) is arranged at the upper part to detect the completion of loading. The switch SW2 (11) is arranged at the lower part to detect the completion of ejection. Further, there are provided an insertion detecting switch SW3 (12) arranged to detect the insertion of the cartridge 1, and a cartridge-chamber-lid closing completion detecting switch SW4 (13) arranged to detect the completion of closing of a cartridge chamber lid 106. The feed screw 6 is driven by a transporting motor 14, and the opening/closing driver 3 is driven by an opening/closing motor 15. The detection by these switches and driving by these motors are controlled by a microcomputer 16.

Figure 9:
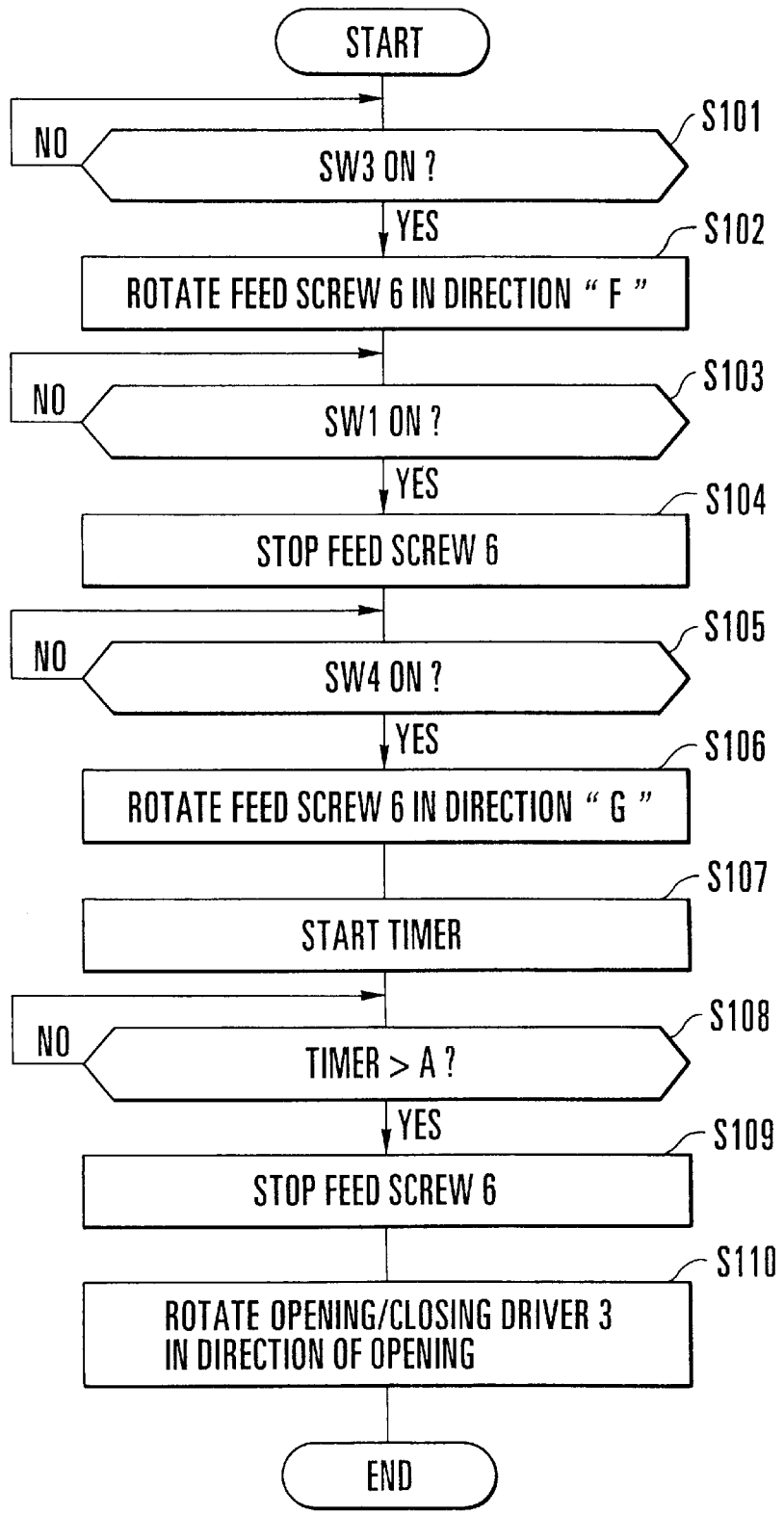
FIG. 9 is a flow chart showing an operation of a microcomputer shown in FIG. 8 to be executed in loading the cartridge and setting the cartridge in a floating state.
Figure 10:
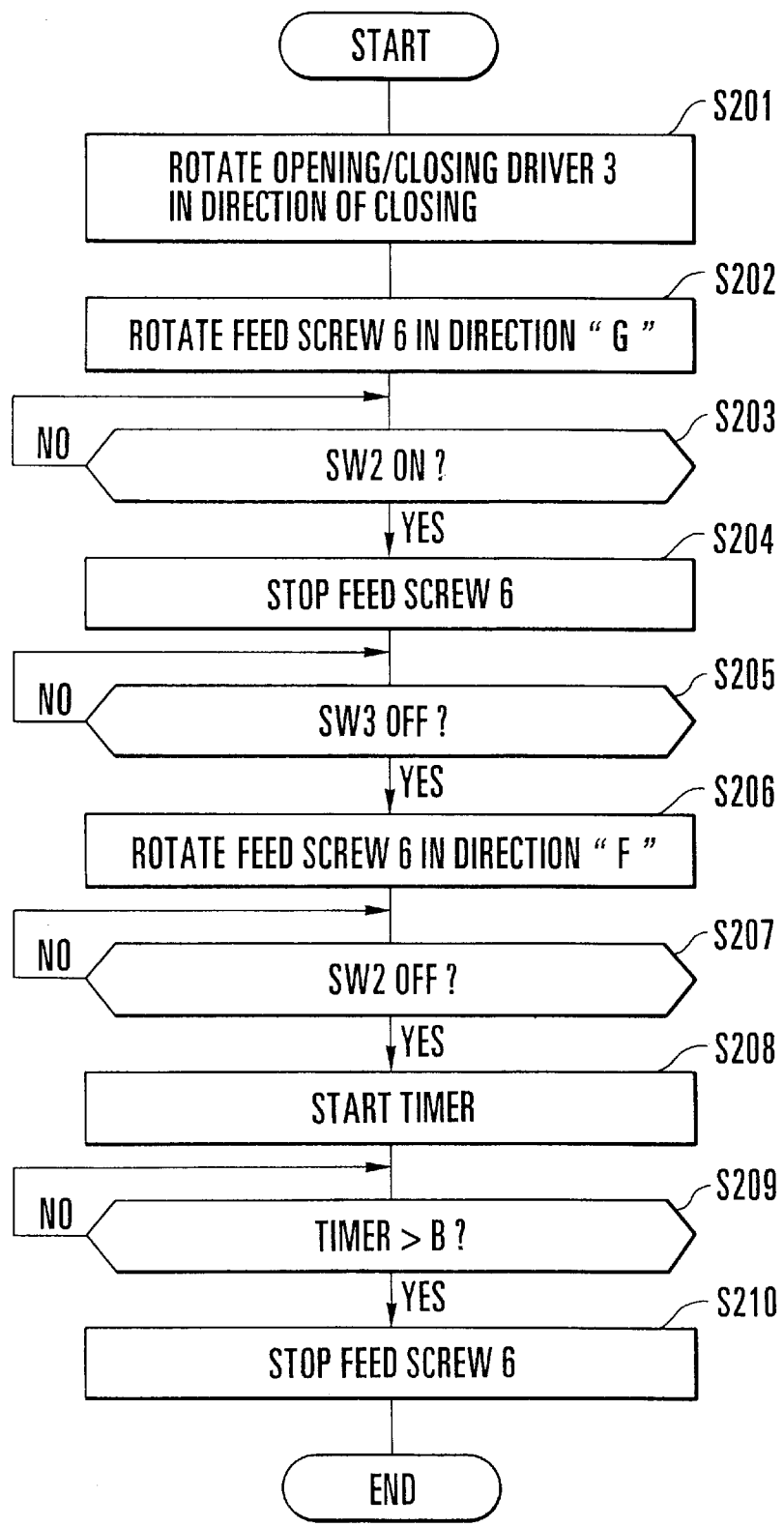
FIG. 10 is a flow chart showing an operation of the microcomputer of FIG. 8 to be executed in ejecting the cartridge from the camera.

With the embodiment configured as described above, the cartridge 1 is loaded, brought into the floating state and ejected under the control of the microcomputer 16 as described below with reference to FIGS. 9 and 10, which are flow charts showing the control operation of the microcomputer 16.

A range of actions from the insertion of the cartridge 1 to the loading and floating of the cartridge 1, including an opening action on the light-shielding opening/closing door 1e, will be described first with reference to FIGS. 4(a), 4(b), 5(a), 5(b), 7(a) and 7(b) along with the flow chart of FIG. 9, as follows.

The feed screw 6 is in repose with the delivery base 7 having been moved to a predetermined extent in the loading (drawing-in) direction from a position where the ejecting action is completed [see FIGS. 6(a) and 6(b)]. The feed screw 6 is brought to this position by rotating the feed screw 6 in the drawing-in direction (the direction of arrow F) from the ejection-completed position for a predetermined period of time after turning-off of the ejection-completion detecting switch SW2, as will be described later. In this state, the drawing-in hook 8 has been fully swung in the direction of arrow E, in which the hook claw 8b can engage the recessed part 1f, and the delivery base 7 which holds the hook 8 has been fully rotated in the direction of arrow F [see FIGS. 4(a), 7(a) and 7(b)].

When the cartridge 1 is inserted by the operator of the camera from below as viewed on FIGS. 7(a) and 7(b), an edge part of the cartridge 1 first comes into contact with the guide part 7d of the delivery base 7, so that the delivery base 7, the delivery hook 8 and the leaf spring 9 are caused to rotate together on the feed screw 6 in the direction of arrow G (ejecting direction). At this time, since the hook claw 8b also rotates, relative positions of the recessed part 1f and the hook claw 8b remain unchanged no matter how the cartridge 1 may move. The hook claw 8b is pushed by the edge of the cartridge 1 when the cartridge 1 moves further upward. Then, after being caused by the edge part of the cartridge 1 to swing once in the direction of arrow D (non-engaging direction), the hook claw 8b comes to engage the recessed part 1f.

In other words, the guide part 7d is constantly in contact with the external wall of the cartridge 1 to allow the hook claw 8b to keep on engaging the recessed part 1f following any movement of the cartridge 1 without fail irrespectively of a manner in which the cartridge 1 is loaded by the camera operator and no matter how the cartridge 1 may be caused to move inside the cartridge chamber 4 by the unevenness or inconstancy in size of the cartridge 1. This advantageous effect is attained by the arrangement that not only the hook claw 8b is allowed to swing in the direction of arrow D or E but also the delivery base 7, etc., are arranged to be urged by a spring force to rotate together as a whole in the direction of arrow F or G. The hook claw 8b which is an engaging claw is thus arranged to engage the cartridge 1 in the state of being movable in these two independent directions.

With the hook claw 8b caused to engage the cartridge 1, when the camera operator pushes the cartridge 1 further into the cartridge chamber 4, the insertion detecting switch SW3 is turned on. Then, at a step S101 of FIG. 9, the microcomputer 16 makes a check for the state of the insertion detecting switch SW3. When the switch SW3 is found to be turned on, the flow of operation comes to a step S102. At the step S102, the transporting motor 14 is driven to rotate the feed screw 6 in the direction of loading or drawing-in (direction of arrow F). The cartridge 1 begins to be drawn into the cartridge chamber 4.

In this instance, if the insertion detecting switch SW3 is turned on before the recessed part 1f of the cartridge 1 engages the hook claw 8b of the drawing-in hook 8, the delivery base 7 would move in the direction of drawing-in while the cartridge 1 is not drawn in. To prevent such a trouble, the embodiment is configured to satisfy the above-stated condition "X<Y", to have a sufficient amount of play in the direction of loading the cartridge 1 after the engagement of the hook claw 8b and to have the insertion detecting switch SW3 turned on at about the middle point of the play.

Further, since the hook claw 8b is urged by a spring force to move in two independent directions, the cartridge 1 is never allowed to disengage while it is in process of being drawn in.

Further, since the feed screw 6 is a left lead screw, the feed screw 6 urges the delivery base 7 to rotate in the direction of arrow F (loading direction) also while the feed screw 6 is rotating to move the delivery base 7 in the drawing-in direction. In other words, during the process of drawing in the cartridge 1, the guide part 7d of the delivery base 7 is kept in contact with the external wall of the cartridge 1 even without the urging spring force of the second spring part 9b of the leaf spring 9. Hence, the hook claw 8b can be moved in the direction of arrow G or F following the motion of the cartridge 1. Therefore, as shown in FIGS. 7(a) and 7(b), as the cartridge 1 moves in the loading direction, the cartridge chamber 4 continues from the second wall part 4b toward the third wall part 4c which has a deeper groove to prevent the spring force of the second spring part 9b of the leaf spring 9 from being exerted.

At a step S103, a check is made for the state of the loading-completion detecting switch SW1. When the switch SW1 is found to be turned on with the cartridge 1 completely loaded (drawn in) as shown in FIG. 4(b), the flow of operation comes to a step S104. At the step S104, the microcomputer 16 stops the feed screw 6 from rotating by bringing the transporting motor 14 to a stop.

Figure 5A:
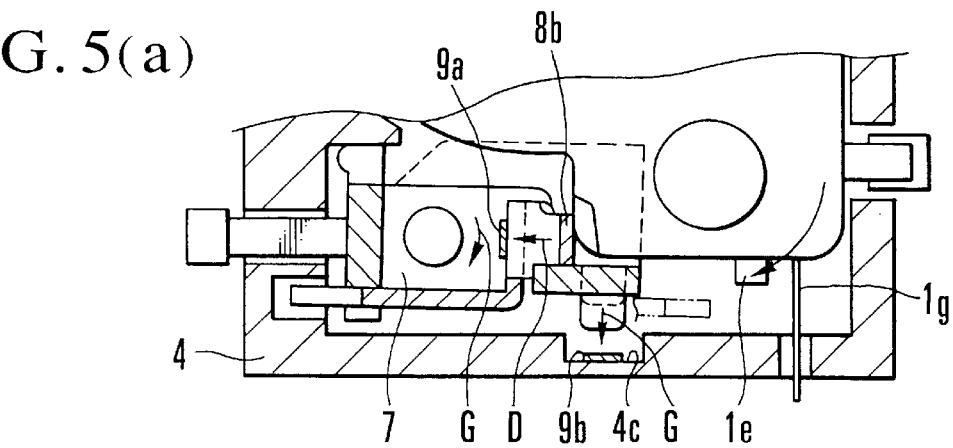
FIGS. 5(a) and 5(b) are sectional views showing the camera of FIG. 1 in a state obtained when the cartridge is made to be floating and a light-shielding opening/closing door is opened.

The cartridge 1 is not in the floating state immediately after completion of the drawing-in action, because the hook claw 8b is still engaging the recessed part 1f of the cartridge 1. At a step S105, a check is made for the state of the cartridge-chamber-lid closing completion detecting switch SW4. When the switch SW4 is turned on with the cartridge chamber lid 106 closed, the flow comes to a step S106 to cause the feed screw 6 to be reversely rotated in the delivery direction (the direction of arrow G) for a predetermined period of time "A". The time "A" is a length of time necessary in moving the delivery base 7 and the drawing-in hook 8 to positions where they do not touch the cartridge 1, as shown in FIGS. 5(a) and 5(b).

In other words, at the step S106, the feed screw 6 is caused through the transporting motor 14 to begin to rotate in the delivery direction (direction of arrow G) by the microcomputer 16. At a step S107, a timer within the microcomputer 16 is caused to start counting the predetermined period of time "A". At a step S108, the flow waits till the time counted by the timer reaches the predetermined period of time "A". When the time counted by the timer is found to have reached the predetermined period of time "A", the flow comes to a step S109. At the step S109, the rotation of the feed screw 6 is brought to a stop by causing the transporting motor 14 to stop driving.

Figure 5B:
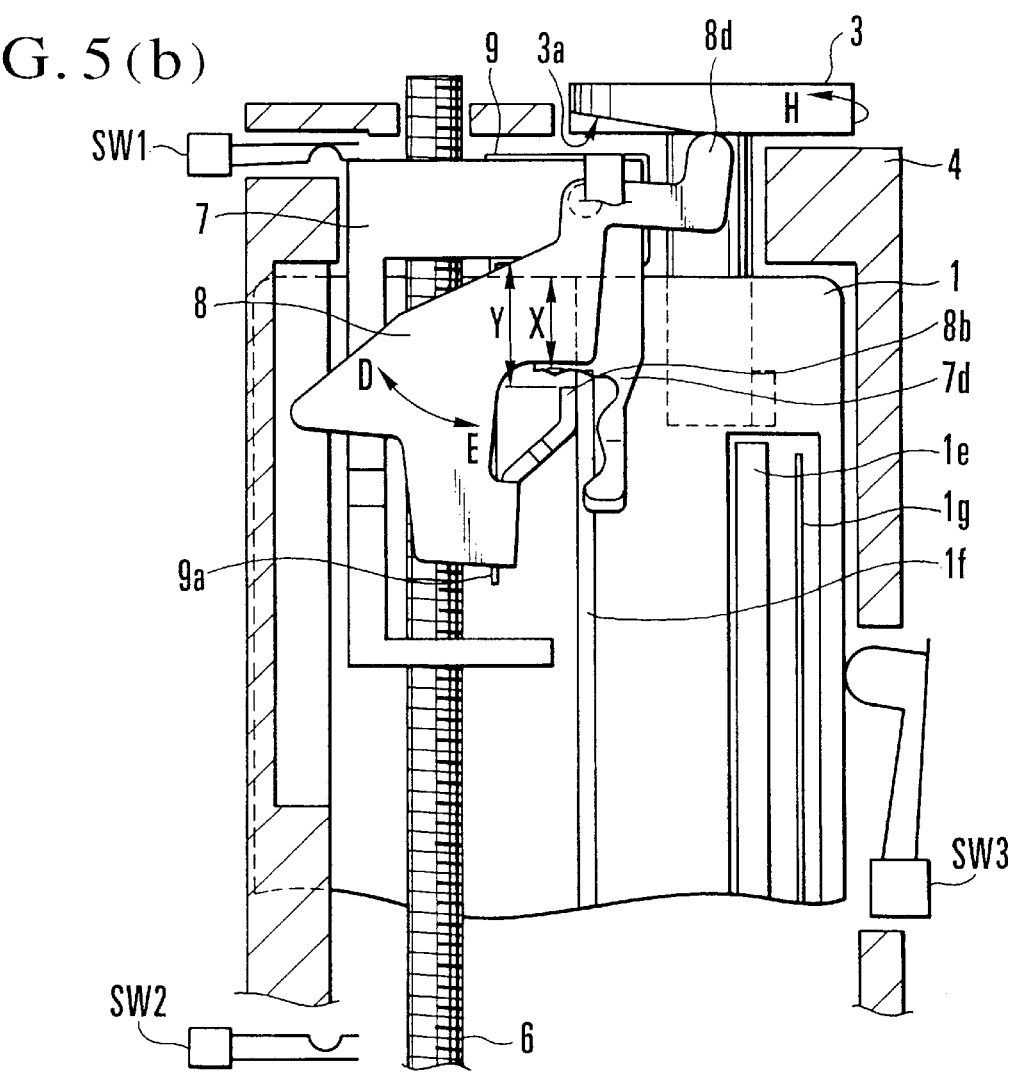

The delivery base 7 is thus brought into a state shown in FIG. 5(b). In this state, since no urging force of the second spring part 9b is exerted, the cartridge 1 is no longer laterally pushed by the guide part 7d of the delivery base 7 after the feed screw 6 ceases to rotate.

At a step S110, to have a film 1g sent out from the cartridge 1, the microcomputer 16 causes the light-shielding opening/closing door 1e to be opened by causing the opening/closing driver 3, through the opening/closing motor 15, to rotate in the direction of opening (arrow H). In association with this action, the cam face 3a of the opening/ closing driver 3 pushes the driving arm 8d of the drawing-in hook 8 to cause the drawing-in hook 8 to swing in the direction of arrow D [see FIG. 5(b)].

As a result, both the delivery base 7 and the drawing-in hook 8 become completely away from the cartridge 1 to bring about without fail the floating state. In the floating state, the cartridge 1 is supported only by the film transport fork 2 and a support member 104 provided on the cartridge chamber lid 106.

Next, the cartridge ejecting operation of the embodiment will be described.

The cartridge ejecting operation is performed basically in a manner reverse to the cartridge drawing-in operation. A film rewinding action and other actions that are not immediately related to this invention are omitted from the following description. With the film 1g assumed to be completely rewound into the cartridge 1, the cartridge ejecting operation is described as follows with reference to the flow chart of FIG. 10.

At a step S201, to close the light-shielding opening/closing door 1e, which is open, the microcomputer 16 first causes the opening/closing driver 3 to rotate in the direction of closing through the opening/closing motor 15. Although the drawing-in hook 8 then swings in the direction of arrow E, this action bears no direct relation to the cartridge ejecting operation. At a step S202, the microcomputer 16 causes the feed screw 6 to rotate in the direction of arrow G (ejecting direction) through the transporting motor 14. The rotation of the feed screw 6 causes the delivery arm part 7e of the delivery base 7 to abut on the upper surface of the cartridge 1 and to push out the cartridge 1. At a step S203, the microcomputer makes a check to find if the ejection-completion detecting switch SW2 (11) has been turned on. If so, the flow of operation comes to a step S204. At the step S204, the rotation of the feed screw 6 is brought to a stop by causing the transporting motor 14 to stop driving.

At this time, the stopper part 8c of the drawing-in hook 8 abuts on the hook abutting part 4d of the cartridge chamber 4 concurrently with the turning-on of the ejection-completion detecting switch SW2 (11), as shown in FIGS. 6(a) and 6(b). Then, the drawing-in hook 8 is caused to swing in the direction of arrow D to disengage the hook claw 8b from the recessed part 1f of the cartridge 1. In this state, the cartridge 1 can be pulled out by the camera operator.

The insertion detecting switch SW3 (12) is turned off when the cartridge 1 is pulled out by the operator. After that, to bring about an initial state as mentioned in the foregoing, the delivery base 7 is moved to a predetermined extent from the ejection-completed position [see FIGS. 6(a) and 6(b)] in the loading (drawing-in) direction, and the rotation of the feed screw 6 is brought to a stop in the initial state thus obtained. For this purpose, the embodiment operates as follows.

When the microcomputer 16 finds turning-off of the insertion detecting switch SW3 (12) at a step S205, the flow comes to a step S206 to immediately start rotating the transporting motor 14 in the reverse direction (arrow F). At a step S207, a check is made to find if the ejection-completion detecting switch SW2 (11) has been turned off. If so, the flow comes to a step S208 to start the internal timer. At a step S209, a check is made to find if the time counted by the timer has reached a predetermined period of time "B". If so, the flow comes to a step S210 to bring the rotation of the feed screw 6 to a stop by stopping the transporting motor 14 from driving. As mentioned in the foregoing, the predetermined period of time "B" is a length of time necessary in obtaining the initial state which is necessary for smooth loading after insertion of the cartridge 1. The cartridge ejecting operation is executed as described above.

In the above-described embodiment, when the drawing-in hook 8 having the hook claw 8b which can be engaged and disengaged with and from the recessed part 1f of the cartridge 1, etc., are moved in the direction of loading or ejecting by means of the feed screw 6, the hook claw 8b is supported so as to be movable in two independent directions on a plane extending approximately perpendicular to the loading direction. More specifically, one of the two movable directions is a direction in which the hook claw 8b comes to engage the cartridge 1. The other movable direction is a circumferential direction around the axis of the feed screw (or helicoid) 6. This arrangement enables the hook claw 8b to reliably engage the recessed part 1f without being affected by inconstancy or difference of size of the cartridge 1 and its irregular movement taking place during the loading process. Therefore, the cartridge 1 can be stably loaded without fail.

As mentioned above, after loading the cartridge 1 by using the hook claw 8b and the recessed part 1f, the delivery base 7 is moved to the predetermined extent in the direction of delivery. After that, the hook claw 8b is retracted away from the inside of the recessed part 1f in association with an opening action performed on the light-shielding opening/closing door 1e. Therefore, both the delivery base 7 and the drawing-in hook 8 are moved completely away from the cartridge 1. As a result, there is obtained the floating state, in which the cartridge 1 is supported only by the film transport fork 2 and the support member 104 which is rotatably disposed on the cartridge chamber lid 106 in a position corresponding to the film transport fork 2. The film thus can be stably transported by virtue of the floating state of the cartridge 1.

The individual components shown in schematic or block form in the drawings are all well known in the camera arts and their specific construction and operation are not critical to the operation or best mode in carrying out the invention.

Wile the present invention has been described with respect to what is presently considered to be the preferred embodiment, it is to be understood that the invention is not limited to the disclosed embodiment. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

While the above-described embodiment is arranged to automatically carry out both the loading and ejecting actions, the arrangement may be changed to automatically carry out only the loading action and to carry out the ejecting action either by hand or by a spring charged at the time of loading. The loading action may be arranged to be manually carried out while the ejecting action is arranged to be automatically carried out. The arrangement also may be changed to manually carry out both the loading and ejecting actions.

In the above-described embodiment, the hook claw 8b which is an engaging claw is arranged to be retracted from the recessed part 1f by means of the opening/closing driver 3. However, the invention is not limited to this arrangement. This arrangement may be changed to simply swing or retract the hook claw 8b away from the recessed part 1f by means of a member arranged to abut on the hook claw 8b upon completion of the loading of the cartridge 1.

The above-described embodiment is arranged to have the cartridge 1 loaded by inserting it from the bottom side of the camera. However, the invention is not limited to such arrangement. The arrangement may be changed to load the cartridge 1 from an upper side of the camera. Further, the invention is not limited to the structural arrangement of the cartridge 1 shown in FIG. 1 but is applicable also to a cartridges of any structural arrangement other than the arrangement shown.

Further, in the above-described embodiment, the support member 104 which supports one end of the cartridge 1 is disposed on the cartridge chamber lid 106. The support member 104, however, may be replaced with some member that is arranged, for example, on the bottom side of the cartridge chamber 4 to be retractable at the time of loading. In that instance, the cartridge 1 may be loaded from one side of the camera other than the bottom side.

While the above-described embodiment is arranged to draw the cartridge 1 into the cartridge chamber 4 by engaging the recessed part 1f of the cartridge 1, the arrangement is applicable also to the process of ejecting the cartridge 1. The cartridge engaging manner also may be changed to engage any part other than the recessed part 1f, such as an end part, a protruding part, or the like of the cartridge 1. Then, in the case of such a modification, the shape of the engaging part on the side of the drawing-in device of course may be also changed accordingly.

The invention is not limited to the manner in which the hook claw 8b moves in the above-described embodiment. The hook claw 8b may be arranged to move in any of other suitable manners as long as the hook claw 8b is movable at least in two directions with respect to the moving direction of the cartridge 1. The above-described embodiment is arranged to elastically urge the hook claw 8b to follow the movement of the cartridge 1. That arrangement also may be changed to be applied only to one of the two directions.

The software arrangement and the hardware arrangement of the above-described embodiment are replaceable with each other as desired.

The invention applies not only to the type of cartridge described in the embodiment but also to any other types of cartridge, to a cartridge containing an image recording medium other than a film, to a cartridge of some other kind and also to some other things like a battery, etc., to be loaded.

The invention may be carried out by combining as necessary the embodiment and any modification thereof or their technical elements described in the foregoing.

Further, this invention is applicable to cameras of varied kinds, such as a single-lens reflex camera, a lens-shutter type camera, a video camera, etc., optical apparatus other than cameras, other apparatuses, devices adapted for cameras, optical apparatuses and other apparatuses, and component elements constituting these apparatuses and devices.

What is claimed is:

1. A camera comprising:

a) an engagement portion which engages a cartridge and moves the cartridge relative to a cartridge loading chamber; and b) a holding device which holds said engagement portion so as to be movable in two independent directions during movement of the cartridge into the cartridge loading chamber, each direction being different from the direction of movement of said cartridge relative to said cartridge loading chamber.

2. A camera according to claim 1, wherein said holding device further moves said engagement portion in the direction in which the cartridge is moved by said engagement portion.

3. A camera according to claim 1, wherein said holding device further moves said engagement portion in a direction in which the cartridge is loaded into the cartridge loading chamber.

4. A camera according to claim 3, wherein said holding device moves said engagement portion in a direction in which the cartridge is ejected from the cartridge loading chamber.

5. A camera according to claim 1, wherein said holding device further moves said engagement portion in a direction in which the cartridge is ejected from the cartridge loading chamber.

6. A camera according to claim 1, wherein said holding device includes a screw portion which moves said engagement portion by rotating.

7. A camera according to claim 6, wherein said holding device causes a rotating direction of said screw portion to be one of the two directions in which said engagement portion is held so as to be movable.

8. A camera according to claim 1, further comprising a disengaging device for, after loading the cartridge into the cartridge loading chamber, bringing said engagement portion into a state of not engaging the cartridge.

9. A camera according to claim 1, further comprising a follow-up device for causing said engagement portion to follow the cartridge in a direction of engaging the cartridge.

10. A camera according to claim 9, wherein said follow-up device includes an elastic member.

11. A camera according to claim 1, wherein said engagement portion includes a claw member.

12. A camera according to claim 1, wherein said engagement portion engages a recessed part of the cartridge.

13. A camera according to claim 1, wherein the cartridge includes a cartridge containing an image recording medium therein.

14. A camera according to claim 1, wherein the cartridge includes a cartridge containing a film therein.

15. An apparatus according to claim 1, wherein said holding device holds said engagement portion so as to be rotatable independently in said at least two directions.

16. A camera according to claim 1, where one of said directions of movement is a direction in which said engagement portion moves into engagement with said cartridge.

17. A camera according to claim 16, where the other of said directions of movement is a direction circumferential to the direction of movement of said cartridge relative to said cartridge loading chamber.

18. A camera according to claim 1, where one of said directions of movement is a direction circumferential to the direction of movement of said cartridge relative to said cartridge loading chamber.

19. A cartridge moving apparatus comprising:
  a) an engagement portion which engages a cartridge and moves the cartridge relative to a cartridge loading chamber; and
  b) a holding device which holds said engagement portion so as to be movable in two independent directions during movement of the cartridge into the cartridge loading chamber, each direction being different from the direction of movement of said cartridge relative to said cartridge loading chamber.

20. An apparatus according to claim 19, wherein said holding device further moves said engagement portion in the direction in which the cartridge is moved by said engagement portion.

21. An apparatus according to claim 19, wherein said holding device further moves said engagement portion in a direction in which the cartridge is loaded into the cartridge loading chamber.

22. An apparatus according to claim 21, wherein said holding device moves said engagement portion in a direction in which the cartridge is ejected from the cartridge loading chamber.

23. An apparatus according to claim 19, wherein said holding device further moves said engagement portion in a direction in which the cartridge is ejected from the cartridge loading chamber.

24. An apparatus according to claim 19, wherein holding device includes a screw portion which moves said engagement portion by rotating.

25. An apparatus according to claim 24, wherein said holding device causes a rotating direction of said screw portion to be one of the two directions in which said engagement portion is held so as to be movable.

26. An apparatus according to claim 19, further comprising a disengaging device for, after loading the cartridge into the cartridge loading chamber, bringing said engagement portion into a state of not engaging the cartridge.

27. An apparatus according to claim 19, further comprising a follow-up device for causing said engagement portion to follow the cartridge in a direction of engaging the cartridge.

28. An apparatus according to claim 27, wherein said follow-up device includes an elastic member.

29. An apparatus according to claim 19, wherein said engagement portion includes a claw member.

30. An apparatus according to claim 19, wherein said engagement portion engages a recessed part of the cartridge.

31. An apparatus according to claim 19, wherein the cartridge includes a cartridge containing an image recording medium therein.

32. An apparatus according to claim 19, wherein the cartridge includes a cartridge containing a film therein.

33. An apparatus according to claim 19, wherein said holding device holds said engagement portion so as to be rotatable independently in said at least two directions.

34. An apparatus according to claim 19, where one of said directions of movement is a direction in which said engagement portion moves into engagement with said cartridge.

35. A camera according to claim 34, where the other of said directions of movement is a direction circumferential to the direction of movement of said cartridge relative to said cartridge loading chamber.

36. An apparatus according to claim 19, where one of said directions of movement is a direction circumferential to the direction of movement of said cartridge relative to said cartridge loading chamber.

37. A camera comprising:
  a) an engagement portion which engages a cartridge and moves the cartridge relative to a cartridge loading chamber; and
  b) a holding device which holds said engagement portion so as to be rotatable concentrically and intersectingly with a direction of movement of said cartridge by said engagement portion.

38. An apparatus according to claim 37, wherein said holding device further moves said engagement portion in the direction in which the cartridge is moved by said engagement portion.

39. An apparatus according to claim 37, wherein said holding device further moves said engagement portion in a direction in which the cartridge is loaded into the cartridge loading chamber.

40. An apparatus according to claim 39, wherein said holding device further moves said engagement portion in a direction in which the cartridge is ejected from the cartridge loading chamber.

41. An apparatus according to claim 37, wherein said holding device further moves said engagement portion in a direction in which the cartridge is ejected from the cartridge loading chamber.

42. An apparatus according to claim 19, wherein said holding device includes a screw portion which moves said engagement portion by rotating.

43. An apparatus according to claim 42, wherein said holding device causes a rotating direction of said screw portion to be one of the two directions in which said engagement portion is held so as to be movable.

44. An apparatus according to claim 19, further comprising a disengaging device for, after loading the cartridge into the cartridge loading chamber, bringing said engagement portion into a state of not engaging the cartridge.

45. An apparatus according to claim 19, further comprising a follow-up device for causing said engagement portion to follow the cartridge in a direction of engaging the cartridge.

46. An apparatus according to claim 45, wherein said follow-up device includes an elastic member.

47. An apparatus according to claim 37, wherein said engagement portion includes a claw member.

48. An apparatus according to claim 37, wherein said engagement portion engages a recessed part of the cartridge.

49. An apparatus according to claim 37, wherein the cartridge includes a cartridge containing an image recording medium therein.

50. An apparatus according to claim 37, wherein the cartridge includes a cartridge containing a film therein.

51. An apparatus according to claim 37, wherein said apparatus comprises a camera.

52. An apparatus according to claim 37, wherein said apparatus comprises a cartridge moving apparatus.

* * * * *

UNITED STATES PATENT AND TRADEMARK OFFICE
CERTIFICATE OF CORRECTION

PATENT NO. : 5,943,522
DATED : August 24, 1999
INVENTOR(S) : Kazushige Ichino

Page 1 of 1

It is certified that error appears in the above-identified patent and that said Letters Patent is hereby corrected as shown below:

Column 2,
Line 13, delete "id" and insert --1d --.

Column 13,
Line 7, delete "claim 19" and insert -- claim 37 --.
Line 13, delete "claim 19" and insert -- claim 37 --.

Signed and Sealed this

Twenty-first Day of August, 2001

Attest:

NICHOLAS P. GODICI
Attesting Officer
Acting Director of the United States Patent and Trademark Office